United States Patent
Crum

(10) Patent No.: US 6,982,114 B2
(45) Date of Patent: Jan. 3, 2006

(54) MAGNETIC ENCLOSURE FOR DISPLAY OF VISUAL INDICIA AND IMAGES AND METHOD OF PRODUCING

(75) Inventor: Jesse D. Crum, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 273 days.

(21) Appl. No.: 10/424,387

(22) Filed: Apr. 28, 2003

(65) Prior Publication Data

US 2004/0211512 A1 Oct. 28, 2004

(51) Int. Cl.
*B32B 23/02* (2006.01)

(52) U.S. Cl. ............ 428/192; 428/58; 428/40.1; 428/41.9; 428/195.1; 428/42.2; 428/42.3; 428/42.1; 40/124.04; 40/711; 211/13.1

(58) Field of Classification Search ............ 40/124.04, 40/711; 211/13.1; 428/58, 192, 41.9, 195.1, 428/42.3, 42.2, 42.1, 40.1

See application file for complete search history.

(56) References Cited

U.S. PATENT DOCUMENTS

| | | | | | |
|---|---|---|---|---|---|
| 4,125,653 | A | * | 11/1978 | Muzik | 428/40.9 |
| 5,375,351 | A | * | 12/1994 | King et al. | 40/124.04 |
| 5,412,199 | A | * | 5/1995 | Finkelstein et al. | 235/487 |
| 5,949,050 | A | * | 9/1999 | Fosbenner et al. | 235/449 |
| 6,282,825 | B1 | * | 9/2001 | Godfrey et al. | 40/611.01 |
| 6,354,030 | B1 | * | 3/2002 | Harris | 40/711 |
| 6,400,247 | B1 | * | 6/2002 | King | 335/302 |
| 6,432,520 | B2 | * | 8/2002 | Pynenburg et al. | 428/195.1 |
| 6,436,520 | B1 | * | 8/2002 | Yamamoto | 428/220 |
| 6,743,493 | B2 | * | 6/2004 | Crum et al. | 428/42.2 |
| 6,745,508 | B1 | * | 6/2004 | Ngan | 40/642.02 |

* cited by examiner

Primary Examiner—Rena Dye
Assistant Examiner—Tamra L. Dicus
(74) Attorney, Agent, or Firm—Michael C. Maier

(57) ABSTRACT

The present invention relates to a magnetic enclosure for temporarily retaining documents, printed indicia, photographs or the like. More particularly, the present invention provides an enclosure that is created by laminating a magnetic material to a transparent sleeve created through the production process. The magnetic material serves as a backing member for mounting, displaying and securing printed indicia, creative content or other material in a convenient to use fashion.

13 Claims, 6 Drawing Sheets

MAGNETIC ENCLOSURE FOR DISPLAY OF VISUAL INDICIA AND IMAGES AND METHOD OF PRODUCING

CROSS-REFERENCES TO RELATED APPLICATIONS

None.

FIELD OF THE INVENTION

The present invention relates to a magnetic enclosure for temporarily retaining documents, printed indicia, photographs or the like. More particularly, the present invention provides an enclosure that is created in an economical manner by laminating a magnetic material to a transparent sleeve created through the production process. The magnetic material serves as a backing member for mounting, displaying and for securing printed indicia, creative content or other material in a convenient to use fashion.

BACKGROUND OF THE INVENTION

There are a number of sleeves and other constructions that are available today for holding documents and displaying materials. These constructions can be produced in a number of configurations and may include a pair of plastic sheets, the combination of an opaque sheet and a transparent sheet as well as the use of partially translucent sheets.

In a construction that utilizes two transparent sheets, the sheets are usually aligned with one another and are then bonded or fused either through the use of heat or adhesive along three sides. This creates an opening, usually along the top end edge that can be used to insert the material to be held within the sleeve. With a pair of transparent sheets, a two-sided document can be inserted and is visible on each of the faces of the document, however, if the sleeve is attached to an opaque structure only one side of the document to be displayed is visible.

A similar construction may be produced using the combination of one transparent sheet and one opaque sheet. In such an arrangement, the sheets are again aligned with one another and typically three edges are bonded or fused together to create an enclosure. The opening can be along any edge, but again as provided above, the opening is commonly found along the top end edge. As one of the sheets is opaque, the inserted material is visible only on a single side.

As with each of the foregoing constructions, while the inserted material is viewable, at least on one side, the user of the assembly must then still either pin, tape or otherwise adhere or affix the sleeve to a wall, bulletin board, appliance, structure or the like in order for the passersby to see or witness the material that has been inserted. In addition, such constructions are often flimsy, due to the materials used in fabricating the construction and depending upon the size and/or thickness of the material to be inserted, use of the sleeve can be awkward.

In a number of applications or situations it is generally desirable to be able to temporarily hang or display indicia, creative material or the like. Typically, this is done through the use of repositional or removable adhesives, tapes, tacks and the like. With adhesives, a residue can be left, particularly if the sleeve is left for a prolonged period of time. Likewise, tape may also leave a residue and may be difficult to peel off from the structure to which it has been applied. Tacks of course, while not leaving an adhesive residue will create holes or punctures in the structure that they are used with and after repeated hangings a number of holes will be produced, requiring patching and/or painting to again conceal. The foregoing can be avoided through the use of a bulletin board, cork panels or the like, but this however limits positioning of the display to the location of such panels. In addition, the user is required to purchase the additional structure in order to prepare the display.

Other mechanisms by which to hang or display indicia or creative material include the use of individual magnets, which may be decorative in appearance. Magnets are particularly suitable in today's office environment as cubicle walls and the like often have components which are susceptible to receiving magnets. However, in order to use individual magnets, one must first locate a magnet, which often means removing a magnet that was supporting something else, likely to the detriment of the person who had used the magnet in the first place. Alternatively, the magnet may be used to hold up numerous displays, making the area looked cluttered. In addition, with a build-up of sheet material or thickness beneath the magnet, the strength of the magnetic forces is also diminished and as such the materials supported by the magnet as well as the magnet itself may fall to the ground.

A still further problem with magnets, is that when decorative or theme based magnets are used, particularly in an office or communal environment, the decorative elements may be distasteful or even offensive to individuals who may view the display. In addition, use of colorful magnets can also detract from the message that the magnets are being used to display.

Use of magnet sign supports is generally well known in the signage industry but surprisingly, such devices have not found their way into the office environment or small or home office setting. This is likely due to the complexity and cost associated with such products thereby limiting the potential applications. Such magnetic backing material may include a set of preformed ridges that can be used to temporarily hold or support a plastic film or even the material to be displayed itself. In the former instance, the film is inserted into the ridged areas thereby creating something of a sleeve into which the material to be displayed can be inserted. However, with this construction as neither the plastic sheet material nor visual indicia is held in position, the sheet and indicia is subject to loss due to slipping from the ridged area. Moreover, the manufacture of such ridged areas is expensive in that creating the ridges and sleeve fixtures adds additional steps to the process of producing the construction.

Other uses of magnetically backed display material include magnetic material having a pre-coated layer of adhesive disposed on the material, which is in turn covered by a release liner. This material has a width of about ¼" to around ½" and resembles a roll of adhesive tape in that the product is often wound on itself The user, cuts a piece of the magnetic material to the desired length and then removes the release liner and applies the magnetic material in strips to the back of the material to be displayed. For example, a magnetic strip could be applied to one of the prior art type sleeves discussed above. Producing such a construction is however time consuming, in that it requires cutting of the magnetic material to length, removing the release liner material and positioning of the magnetic strips to complete the assembly. While this ad hoc approach may be a suitable temporary arrangement, it does not solve the long term need of the user, as the adhesive bond between the substrate and the magnetic material mail fail over time causing the display to fall to the ground.

What is needed therefore, is a display assembly, that can easily accommodate and confine material and indicia to be viewed and that overcomes the drawbacks set forth above. In addition, the assembly must be one that can be produced in an economical and efficient manner; such as through an in-line press application that facilitates the production of the display assembly of the present invention.

BRIEF SUMMARY OF THE PRESENT INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one embodiment of the present invention, a laminated construction for containing visual material to be viewed is described and includes a magnetic layer, which has first and second end edges and first and second longitudinally extending sides. The magnetic layer has a predetermined size and configuration and first and second faces that are opposite one another. A first adhesive layer is disposed in a pattern on the magnetic layer on one of the first and second faces. A first imageable layer is provided and has first and second faces, first and second transversely extending end edges and first and second longitudinally extending sides. One of the faces is placed in contact with the first adhesive layer that has been applied or coated on the magnetic layer. A second adhesive pattern is also provided and is applied to the other face of the first imageable layer in a pattern that is distinct from the pattern of the first adhesive layer. A second imageable layer is provided and includes first and second faces, first and second longitudinally extending sides and first and second transversely extending end edges. The construction that is formed when the second imageable layer is adhered to the first imageable layer by the second pattern of adhesive creates an open space that has a size and configuration which is less than the size and configuration of magnetic layer. The open space is used to contain the document or other visible indicia.

In a further embodiment of the present invention, a method of making laminated construction for containing visual material to be viewed is described and includes the steps of initially providing a web of magnetic material having first and second faces. Then a pattern of adhesive is coated on one of the faces of the web of magnetic material. Next, a first imageable layer of material having first and second faces is advanced to an assembly point whereupon the layer is placed into contact with the first pattern of adhesive. A second pattern of adhesive is applied to the other face of the imageable sheet opposite that of the face in contact with the first pattern of adhesive. A second layer of material with first and second faces is applied to the second adhesive pattern such that the imageable layer, second layer and second pattern of adhesive form a pocket to retain visual material.

A still further embodiment of the present invention is described and includes a method of producing a magnetic display form. This embodiment includes the steps of initially providing a laminate that has magnetic properties and a first face and a second face, one of the faces is capable of receiving print or images. Next, a pattern of adhesive is applied to the laminate on one of the first and second faces. The pattern of adhesive has first and second portions. A first web of material is advanced in a machine or first direction and has a first dimension. A second web of material is also advanced in a machine direction and has a second dimension that is different than the first dimension. Then the first web of material is adhered to the first portion of the pattern of adhesive and the second web is applied or adhered to the second portion of the pattern of adhesive. An overlapping arrangement is created between the first and second webs of material so as to provide an accessible opening to a cavity formed between the first and second webs and the laminate.

In yet a still further embodiment of the present invention a substantially quadrate, display assembly is described and includes a magnetic material having a thickness ranging from about 10 to 25 mils and having a first face and a second face. The magnetic material is capable of traversing an in-line press. The substantially quadrate assembly also includes sheet stock that is adhered to a magnetic material and can receive indicia. The sheet stock is selected from a group of materials including bond paper, tag stock and combinations thereof and the sheet stock can transverse an in-line press in conjunction with the magnetic layer. The assembly also includes a transparent layer that has a thickness of greater than about 2 mils and is adhered to the sheet stock through a pattern of adhesive. The sheet stock and transparent layer are adhered together in such a manner so as to create a space between the sheet stock and the transparent layer, and the space has a size less than the sheet stock. The magnetic layer, sheet stock and transparent layer once formed into a laminated construction can be produced from an in-line configuration.

These and other objects of the invention will become clearer from a review of the figures and detailed description of the invention.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description, but it should be understood that the present invention is not to be construed as being limited thereto.

The present invention provides for a much more economical and efficient manner of producing a visual display form construction having an internally formed pocket, cavity, recess or the like on a substrate or laminate that has magnetic properties. The present invention is directed to both the product configuration as well as the methods for producing the assembly, including the ability to produce the assembly in an in-line configuration.

Figure 1:
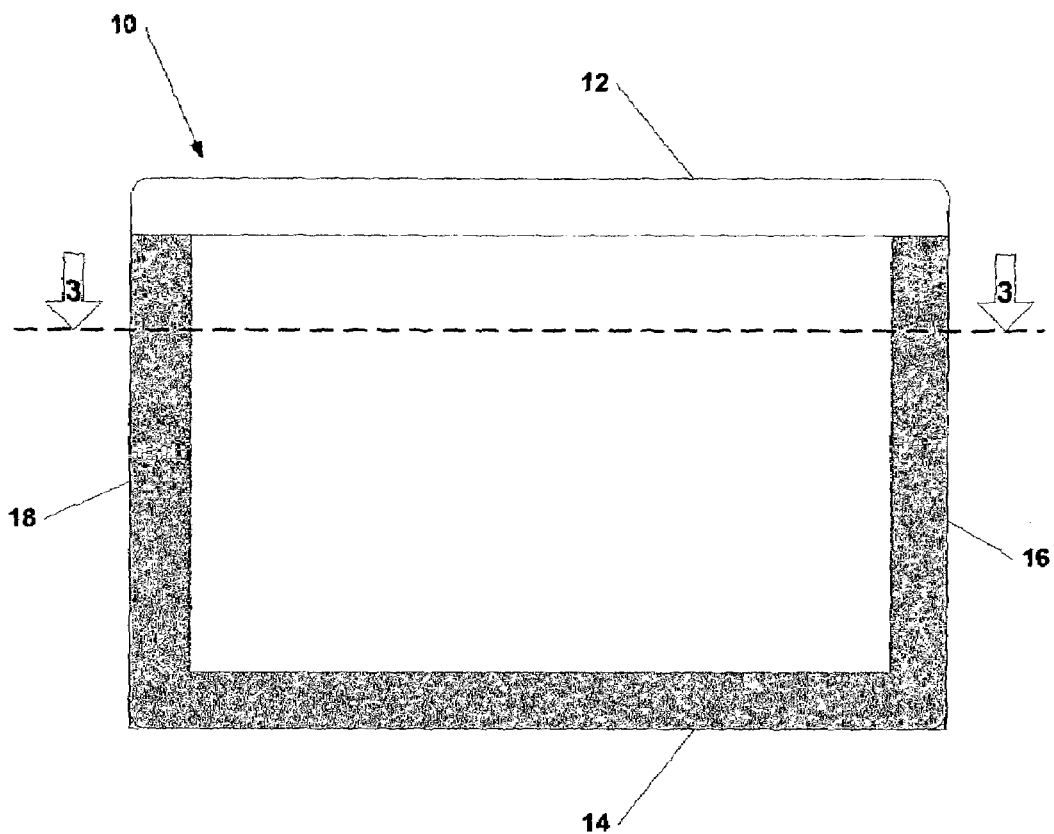
FIG. 1 depicts a front elevation of the visual display form prepared in accordance with the present invention.

Turning now to FIG. 1, an exemplary embodiment of the present invention is depicted generally by reference to numeral 10. The assembly 10 has first and second transversely extending end edges 12 and 14, respectively, and first and second longitudinally extending sides 16 and 18, respectively. As illustrated in FIG. 1, the assembly 10 has been provided with rounded or die cut corners, however, it should be understood that the invention may have squared off edges, diagonal corners and the like. In addition, the configuration of the present invention may be configured into any number of geometric and animate shapes. The manufacturing process described below is adapted to producing such shapes by altering the patterns of adhesive that are applied to the construction and die cutting the assembly 10 into the desired shape as will be understood by those having ordinary skill in the art.

Figure 2:
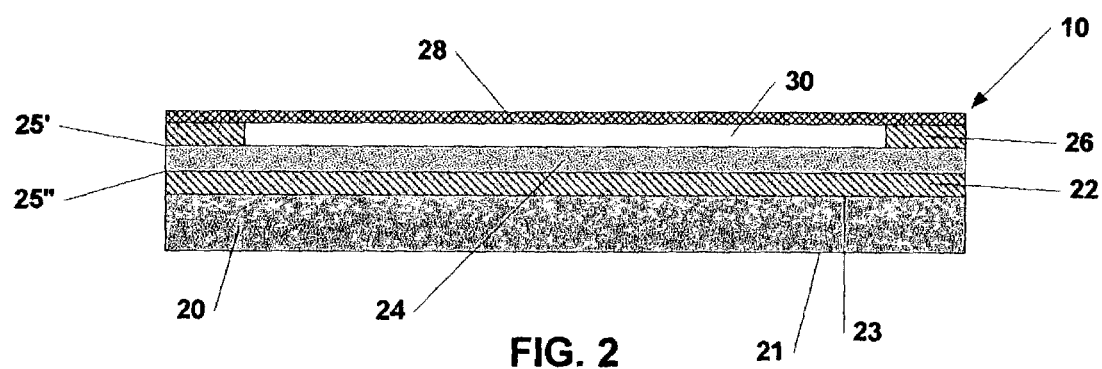
FIG. 2 is a cross sectional view of FIG. 1 shown along line 3—3 depicting the layers of the present invention.

FIG. 2 provides a cross section of assembly 10. The base of the assembly 10 comprises a magnetic layer 20, which has first and second faces 21 and 23, respectively. The magnetic layer 20, as with each of the other layers (22, 24 and 28) of the construction herein, excluding the adhesive patterns, each have first and second transversely extending end edges and first and second longitudinally extending sides. Each of the sides and end edges held generally within the confines of the side and edges of assembly 10 shall be simply referred to with respect to the numerical limitations provided above 12, 14, 16 and 18.

The magnetic material may be purchased from Flexmag Industries, of Marietta Ohio and may have a thickness ranging from 5 to 30 mils, with 10 to 25 mils being preferred and approximately 15 mils being more preferred.

The second face 23 of the magnetic layer 20 has a pattern of adhesive 22 applied to the second face 23. The adhesive layer or pattern 22 may include generally any permanent type adhesive such as pressure sensitive adhesives, acrylic based adhesives, hot melts, cold glues, etc. One such supplier of permanent adhesives is HB Fuller of St. Paul, Minn.

The pattern or layer of adhesive 22 may be coated or applied in any number of configurations. For example, the adhesive 22 may cover the entire face 23 of the magnetic layer 20, may be applied in a spot or other geometric pattern such as lines or stripes. The adhesive layer 22 must however be coated in a sufficient manner and amount so as to provide adequate coverage and adhesion between the layers of the assembly.

Still referring to FIG. 2, an imageable layer 24 is then applied over the pattern of adhesive 23. The term "imageable" as used herein, includes a substrate that is capable of receiving print, indicia or images such as through the use of ink jet, dot matrix, electrostatic and other non-impact printing or imaging means. In addition, the term includes a substrate to which a coating may be applied so as to make it more receptive to receiving print or images. The imageable layer has first and second faces 25" and 25', respectively. The imageable layer 24 may be selected from any number of appropriate materials such as 20–24 pound bond paper, tag or card stock, printable films such as a polyethylene based film or the like. The material for the imageable layer 24 should be selected for its ability to receive toner or accept ink. However, it should be understood that the layer 24 need not be provided with any printing or imaging and may remain blank. In addition, layer 24 may be colored so as to provide a background or contrast to the visual indicia to be inserted within the construction.

Where the imageable layer 24 is provided with printing or images, the printing or imaging may include instructions on use of the form, complimentary graphics to the intended insert or the like. Complimentary graphics may include printed pattern, warning indicia such as the terms "NOTICE" or "CAUTION" or the like. Such printing can be provided off line from the manufacturing operation of the assembly 10 and accomplished by electrostatic print engines, ink jet, and the like. When accomplished apart or away from the manufacturing apparatus, the printing may be done in repetitive patterns so that during the cutting and processing of the assembly 10, it is not significant where the imageable layer 24 is cut or separated from the web on which it is printed.

A second layer or pattern of adhesive 26 is then coated or applied and positioned on the second face 25' of the imageable layer 24. Unlike the first pattern of adhesive 22, the second pattern 26 is applied in a "U" or an inverted "U" shaped configuration. This is required so as to facilitate the preparation of a cavity, recess, pocket or the like so as to be able to receive the material to be displayed in the configuration. The second pattern 26 has a width of about ¼ of an inch to about ½ of an inch with about ⅜ of an inch being preferred. The width of the adhesive pattern 26 must be sufficient in order to prevent the inserted material from poking through the edge of the construction so that rips or weaknesses are not created in the assembly 10. That is, if a substantially rigid piece is inserted into the assembly 10, the piece may have a sharp corner that could puncture or break through the pattern of adhesive.

FIG. 2 also illustrates the imposition of the next layer 28 on the assembly 10. The layer 28 again may be imageable so that complimentary graphics, colors, or indicia can be provided to the construction to highlight or facilitate the communication of the message of the insert to be provided in the assembly 10.

Layer 28 is adhered to the assembly 10 through the pattern of adhesive 26 on its first face. The second face would then serve as the visible exterior face of the layer 28 and hence assembly 10.

The layer 28 is desirably at least translucent if not transparent, which is preferred. In addition, the layer 28 may be provided with only portions of the layer being transparent with other areas of layer 28 being only translucent or opaque. In this way, use instructions can be provided on the sides of the insert, and would be concealed from view due to the translucence or opaque characteristics of the layer 28.

The combination of layer 28, adhesive pattern 26 and layer 24 form to create a pocket, recess, cavity or the like 30, which can accommodate a variety of inserts. The size of the cavity would vary depending upon the size of the layers 20, 24 and 26, respectively. For example, if the layers 20, 24 and 26 were each 8½ by 11 inches, then the interior cavity 30 would be approximately 7½" by 10½". Obviously, other sizes and dimensions are possible.

In still a further embodiment layer 28 could be provided with a patterned transparency so as to serve as part of a sweepstakes or promotion. Users or recipients of a game piece would bring the game piece to a predetermined location and insert the piece into the assembly. The patterned transparency would illustrate whether the consumer or recipient revealed a specific code or message such as "WINNER" or a combination that may unlock a prize.

Figure 3:
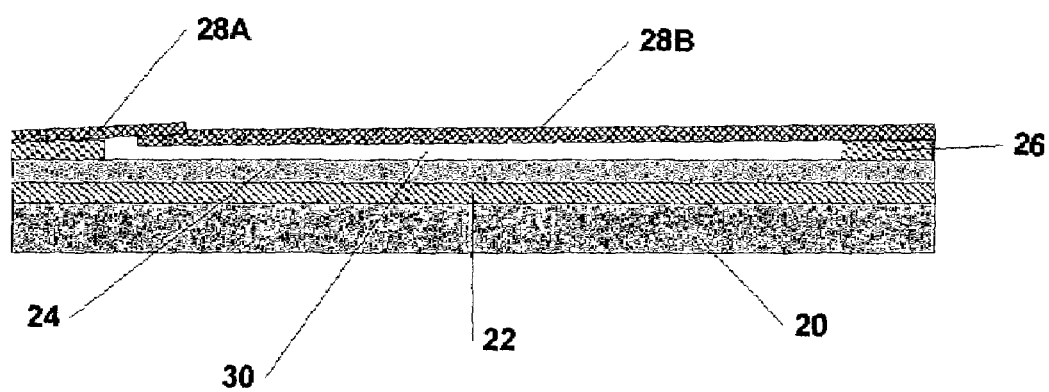
FIG. 3 is cross sectional view of FIG. 1 shown along line 3—3, illustrating a further embodiment of the present invention.

Turning now to FIG. 3, a further embodiment of the present invention is provided. In this embodiment, the construction of the layers is similar to that as depicted above, however, layer 28 is now portioned into first and second portions, 28A and 28B, respectively. As depicted in the drawing, portion 28A is substantially smaller than portion 28B, but may be approximately equal to portion 28B, that is each portion may be between 50 to 60% of the length and width of layer 28. For greater clarity, and in order to create the overlapping arrangement, if one portion were provided that made up 50% of the length and width of the layer 28, then the other portion would have to be at least slightly larger than the other portion, approximately 51–100% of the size of the sheet so that an overlap was created between the two portions and more preferably about 51 to about 65%. In an exemplary embodiment, the amount of overlap ranges from at least ⅛ of an inch to about ¾ of an inch with about ⅜ of an inch being preferred. That is, one of sheets 28A or 28B would preferably have from 51% to 65% of the size of the other of sheets 28A or 28B.

Figure 4:
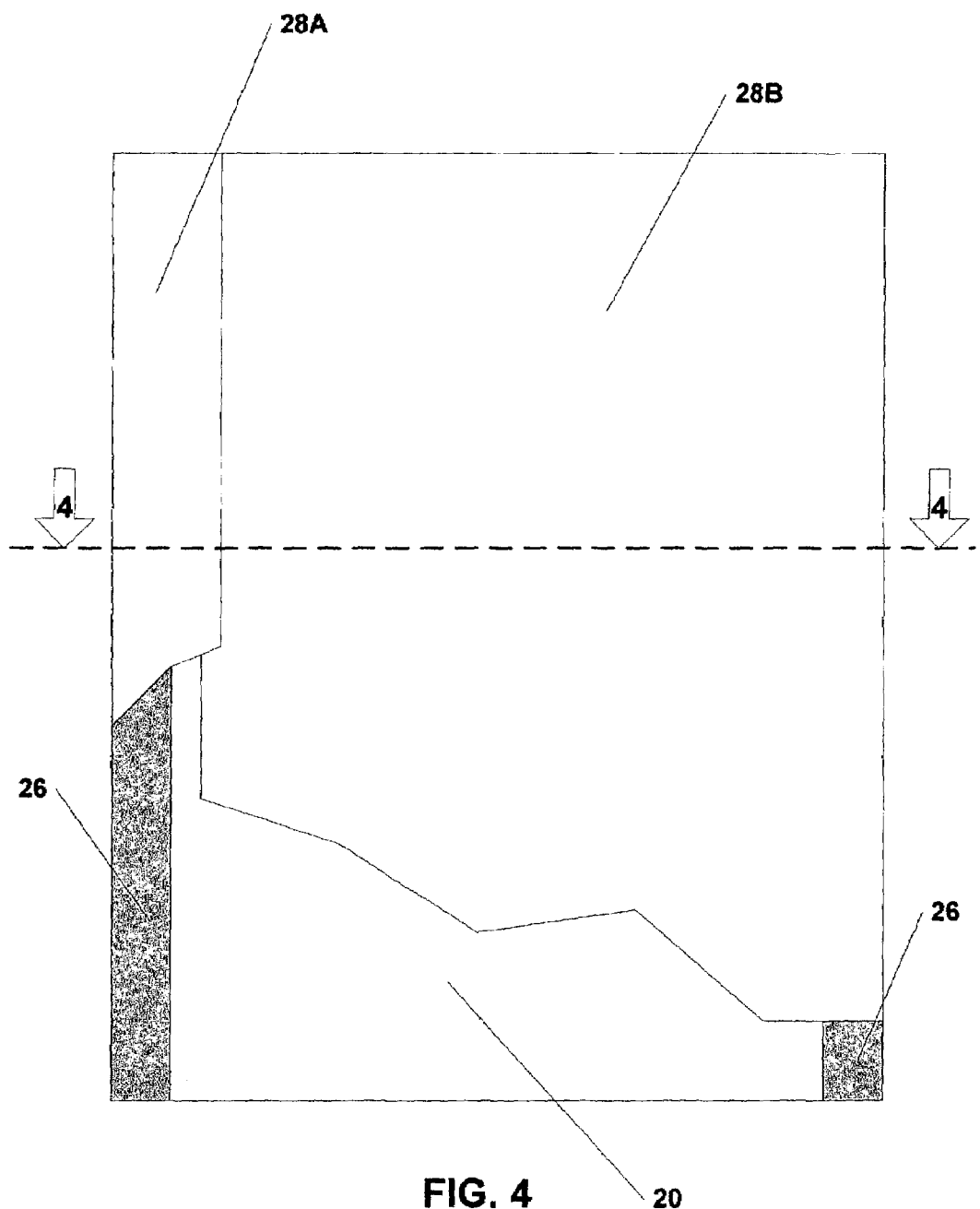
FIG. 4 a front elevation illustrating the layers adhered to one another.

FIG. 4 provides a front elevational view showing overlapping portions 28A and 28B. Reference to numeral 20 in this embodiment includes not only the magnetic layer by also a laminated magnetic layer having a imageable layer applied thereover.

The overlap created by portions 28A and 28B in effect provides a resealable enclosure for the material to be inserted in the cavity 30. In addition, in a further embodiment of the present invention, the second pattern of adhesive 26 may then be provided in an almost full perimeter seal. That is, the adhesive extends nearly substantially entirely around the perimeter of the sheet or layer 26. The break in the adhesive seal corresponds with the area of the overlap of the assembly 10. In this embodiment, a pouch like structure is created wherein the inserts provided in cavity 30 cannot fallout regardless of the positions of the assembly. This is do to the nearly complete perimeter seal retains the insert in a secure position and the overlapping flap create a closure that requires manipulation in order for the material to be removed from the interior.

In the present invention, either one or both of the layers 24 or 28 may be printed with indicia or images, such as graphics. The printing or imaging may be complimentary or supplemental to the material to be inserted. The printing on layer 24 may also be viewable through changing the pattern of transparencies on layer 28, so that a changeable sign or background can be created by the construction without the need to create an entirely new assembly 10.

Figure 5:
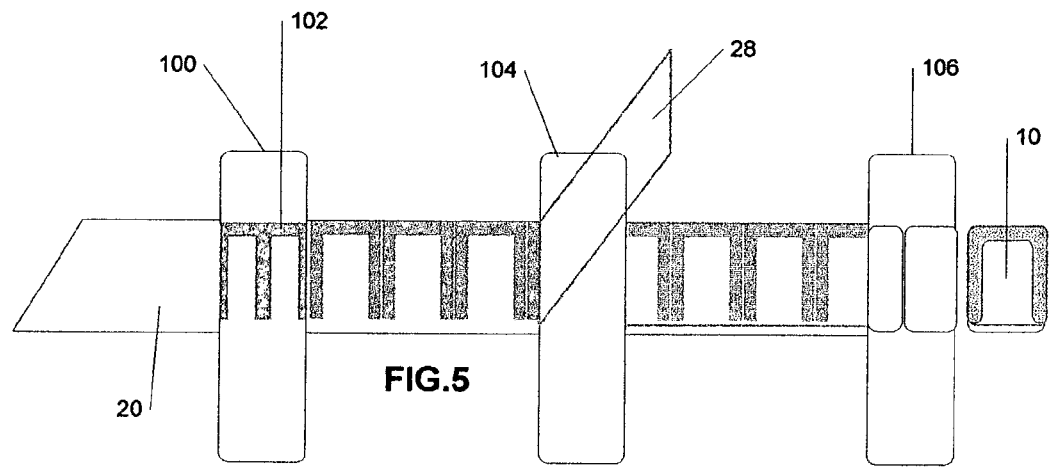
FIG. 5 is a schematic view of an exemplary embodiment used in the construction of the present invention.

Turning now to FIG. 5, where an exemplary schematic is provided for producing the present invention. In this example, a continuous web of magnetic material 20 is provided. The present invention may also be made in a cut sheet arrangement, wherein the difference includes supplying a stack of cut sheets of magnetic material to the manufacturing operation. It should also be understood that the web of material may be a laminated construction in which a magnetic sheet has an imageable layer already adhered to one side of the web.

The web of magnetic material 20 is provided to a rotary press 100 where a pattern of adhesive 102 is applied to the web of material 20. Where the web is provided in a non-laminated arrangement, the web 20 first has an imageable layer applied to the layer through the use of a permanent adhesive as described above and is then supplied to the rotary press 100.

Once the pattern of adhesive 102 is applied to the web 20, the web 20 is provided to a nip roller 104. It should be understood that depending on the configuration of the final assembly 10, the adhesive pattern 102 may comprise a "U" shaped pattern, an inverted "U" or other shapes as are necessary, including a perimeter seal and a nearly complete perimeter seal.

At the nip roller 104, the web of material 20 having the pattern of adhesive 102 applied thereto is joined with a second layer 28 that is supplied from a continuous web arrangement. Again, in a cut sheet embodiment, previously cut sheets of layer 28 would be fed into a cooperative arrangement with the layer of magnetic material 20.

The nip roller 104 causes the web of material 20 to be bound or adhesively secured to the second layer 28 due to the adhesive pattern 102. The web of material continues to travel in a machine direction and is severed into individual assemblies 10 by a die or other cutting mechanisms 106. After the cutting or severing operation, the individual assemblies are collected for distribution (not shown).

Figure 6:
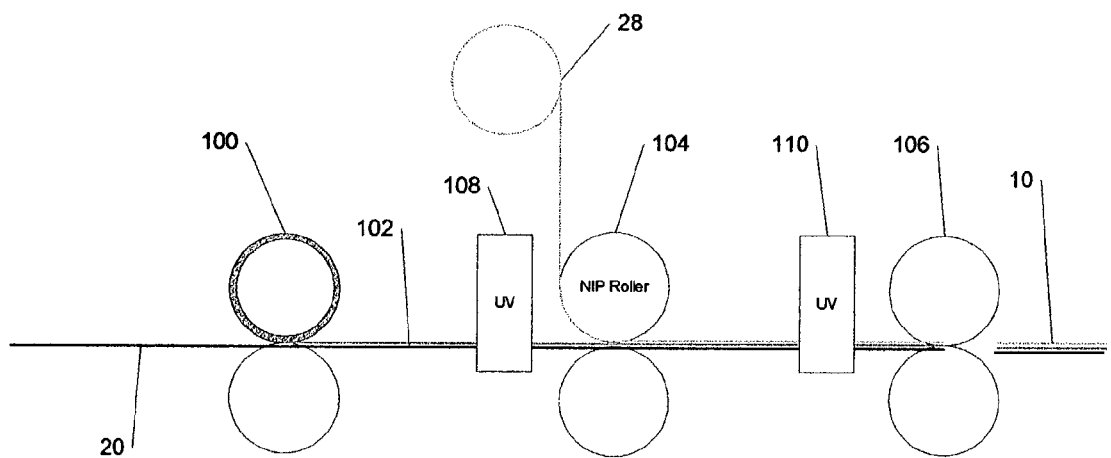
FIG. 6 is a further schematic view of the process depicted in FIG. 5.

Now with respect to FIG. 6, a side view of the schematic apparatus as described above in reference to FIG. 5 is provided. The web of magnetic material 20 is advanced in a machine direction. As provided previously, the web 20 may be provided in a laminated or non-laminated configuration, that is, with or without a layer of imageable material thereon. The web 20 of material is passed through a rotary press 100 that applies a pattern of adhesive 102 to the web 20. The coated web 20 may then be passed through an UV treatment zone (curing, drying) 108 to cure the adhesive. Next, the web 20 travels in the machine direction through a nip roller 104 where layer 28 is bound or adhesively secured to the web 20 to create a further laminated construction. The laminated construction may then pass through a second UV station 110 and then finally to a die cutting or severing station 106 after which the individual assemblies 10 are created and then stacked for distribution (not shown).

Figure 7:
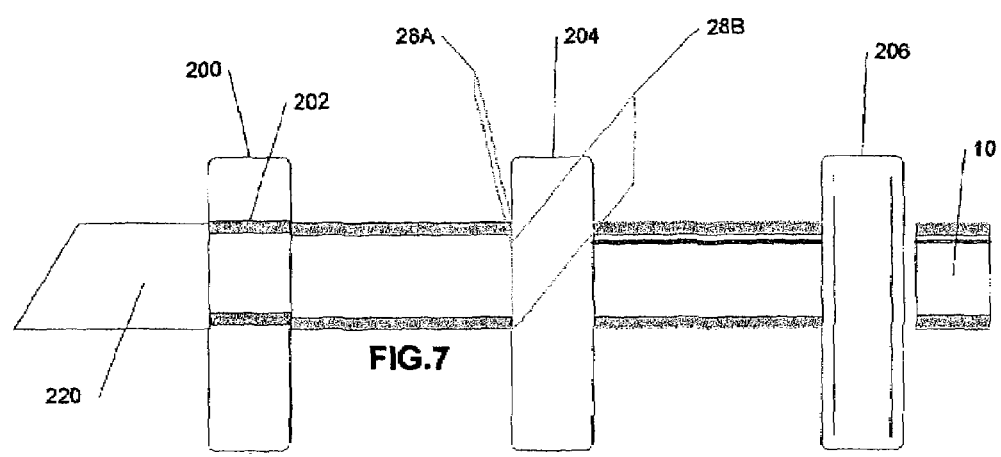
FIG. 7 is a schematic depiction of a process used in the preparation of a further embodiment of the present invention.

Turning now to FIG. 7, where a further illustrative embodiment of the present invention is presented. Again a web 220 of magnetic material is moved in a machine direction and passed to a rotary press 200 to apply a pattern of adhesive 202. The coated web is then passed to a nip roller 204 where first and second portions, 28A and 28B, respectively, of a second layer are provided. The nip roller 204 presses the first and second portions of the layer 28 into contact with the adhesive pattern 202, thereby forming an adhesive bond and a laminated structure. The structure is then forwarded to a die cutting or severing step 206 where the web is separated into individual pieces.

Figure 8:
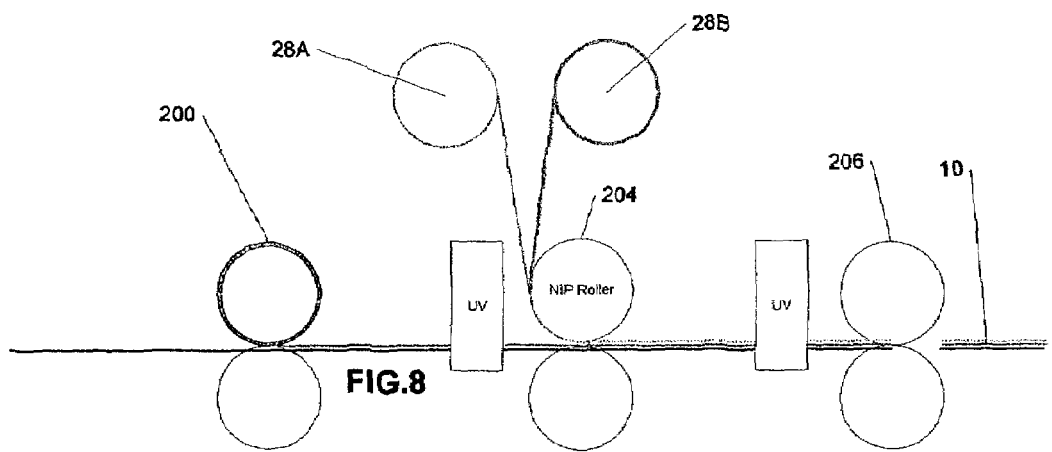
FIG. 8 is a further schematic of the process used in FIG. 7 above.

FIG. 8 provides an alternative configuration for the method of the present invention. In FIG. 8, unwinds are provided for each of the first and second portions 28A and 28B of the present invention. The first and second portions 28A and 28B are provided in an overlapping arrangement so as to create a resealable area that prevents the inserts from escaping from the cavity 30 as provided in FIG. 1.

The overlapping arrangement of the first and second portions 28A and 28B of the present invention may also be provided with a repositional adhesive or a cohesive seal (mating patterns of adhesive that bond only to one another) so that a further secure closure can be provided. In this embodiment, one of the first and second portions 28A and 28B would be provided in a pre-coated arrangement and fed into the manufacturing arrangement as provided in accordance with the present invention.

It will thus be seen according to the present invention a highly advantageous visual display form has been provided.

While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

What is claimed is:

1. A laminated construction for containing visual material to be viewed, comprising;
    a magnetic layer, said magnetic layer having first and second end edges and first and second longitudinally extending sides, and said magnetic layer having a size and configuration and having first and second faces;
    a first adhesive layer disposed in a pattern and applied to at least a portion of said first magnetic layer on one of said first and second faces;
    a first imageable layer having first and second faces, first and second transversely extending end edges and first and second longitudinally extending side edges, one of said first and second faces being placed into contact with the first adhesive layer disposed on one of said first and second faces of said magnetic layer;
    a second adhesive layer applied to at least a portion of the other of said first and second faces of said first imageable layer; said second adhesive layer being disposed in a pattern distinct from the pattern of said first adhesive layer;
    a second imageable layer having first and second faces, first and second longitudinally extending sides and first and second transversely extending end edges; and
    wherein said second imageable layer adhered to said first imageable layer by said second adhesive layer form an open space having a size and configuration less than said size and configuration of said magnetic layer.

2. A laminated construction for containing visual material to be viewed as recited in claim 1, wherein said first and second imageable layers having first and second properties and each of said first and second properties is distinct from one another.

3. A laminated construction for containing visual material to be viewed, as recited in claim 1, wherein said first imageable layer is provided with indicia that is complimentary to the visual material to be viewed.

4. A laminated construction for containing visual material to be viewed, as recited in claim 1, wherein at least one of the first and second layers is provided with indicia or images.

5. A laminated construction for containing visual material to be viewed, as recited in claim 1, wherein said second imageable layer is transparent, translucent or combinations thereof.

6. A laminated construction for containing visual material to be viewed, as recited in claim 1, wherein said second imageable layer has first and second portions, with one of said portions being larger than the other of said first and second portions.

7. A laminated construction for containing visual material to be viewed, as recited in claim 6, wherein said first and second portions of said second imageable layer overlap one another to form an opening.

8. A laminated construction for containing visual material to be viewed, as recited in claim 1, wherein the first imageable layer is selected from bond paper, card stock, tag stock and combinations thereof.

9. A laminated construction for containing visual material to be viewed, as recited in claim 1, wherein the second imageable layer is selected from polyethylene terephalate, polypropylene and polyester based films.

10. A laminated construction for containing visual material to be viewed, as recited in claim 1, wherein each of the first and second patterns of adhesive are permanent pressure sensitive adhesives.

11. A laminated construction for containing visual material to be viewed, as recited in claim 1, wherein the second imageable layer has a pattern of transparent portions.

12. A laminated visual display form assembly for containing visual material to comprising;
    a magnetic layer, said magnetic layer having first and second end edges and first and second longitudinally extending sides, and said magnetic layer having a size and configuration and having first and second faces at least one of which is capable of receiving printing or images;
    an adhesive layer disposed in a pattern and applied to at least a portion of said first magnetic layer on one of said first and second faces;
    a transparent layer having first and second faces, and first and second portions; and
    wherein said transparent layer is adhered to said magnetic layer by said adhesive layer to form an open space and said first and second portions overlap by at least ⅛ of an inch to create a resealable closure.

13. A substantially quadrate, display assembly, comprising;
    a magnetic material having a thickness ranging from about 10 to 25 mils and having a first face and a second face, said magnetic material being capable of traversing a in-line press;
    sheet stock adhered to said magnetic material, said sheet stock being capable of receiving indicia wherein said sheet stock is selected from a group consisting of bond paper, tag stock and combinations thereof and said sheet stock being capable of traversing an in-line press in conjunction with said magnetic layer;
    a transparent layer having first and second portions which overlap one another by at least ⅛ of an inch to create a resealable closure, said transparent layer having a thickness of greater than about 2 mils is adhered to said sheet stock through a pattern of adhesive so as to create a space between said sheet stock and said transparent layer, said space having a size less than said sheet stock; and
    wherein said magnetic layer, sheet stock and transparent layer are formed into a laminated construction and can be produced from an in-line configuration.

* * * * *